(12) United States Patent
Irvin et al.

(10) Patent No.: US 7,351,448 B1
(45) Date of Patent: Apr. 1, 2008

(54) ANTI-REFLECTIVE COATING ON PATTERNED METALS OR METALLIC SURFACES

(75) Inventors: David J. Irvin, Ridgecrest, CA (US); Andrew Guenthner, Ridgecrest, CA (US); Nicholas Prokopuk, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/911,750

(22) Filed: Jul. 27, 2004

(51) Int. Cl.
*B05D 5/06* (2006.01)

(52) U.S. Cl. .................. 427/162; 427/125; 427/163.1; 427/205; 427/436; 427/438; 427/443.1; 385/40; 385/129; 385/130; 359/580; 359/585; 205/122; 205/264; 205/271; 205/118

(58) Field of Classification Search ................ 427/125, 427/163.2, 205, 435–438, 443.1; 385/40, 385/129, 130; 359/580, 585; 205/118, 122, 205/264, 271
See application file for complete search history.

(56) References Cited

U.S. PATENT DOCUMENTS

| | | | | |
|---|---|---|---|---|
| 4,626,613 A * | 12/1986 | Wenham et al. | ............ | 136/255 |
| 4,750,977 A * | 6/1988 | Marrese | ...................... | 205/148 |
| 5,093,884 A * | 3/1992 | Gidon et al. | ................. | 385/132 |
| 5,449,639 A * | 9/1995 | Wei et al. | .................... | 438/636 |
| 5,633,210 A * | 5/1997 | Yang et al. | .................. | 438/669 |
| 6,184,060 B1 * | 2/2001 | Siniaguine | ................... | 438/106 |
| 6,573,734 B2 * | 6/2003 | He et al. | ..................... | 324/696 |
| 2005/0062130 A1* | 3/2005 | Ciancio et al. | ............. | 257/532 |
| 2005/0167655 A1* | 8/2005 | Furukawa et al. | ............. | 257/20 |

FOREIGN PATENT DOCUMENTS

WO WO 02/095088 A2 * 11/2002

\* cited by examiner

*Primary Examiner*—Alain L. Bashore
(74) *Attorney, Agent, or Firm*—Brian F. Drazich

(57) ABSTRACT

An apparatus and process for coating surfaces of metal or metallic components including providing at least one metal having a patterned outer surface exhibiting an optical reflection greater than about 40%, providing at least one anti-reflective coating material, the anti-reflective coating material(s) including effective amount of electrically conductive light scattering and/or wavelength absorbent properties, and depositing the anti-reflective coating material(s) onto the patterned outer surface(s) of each metal, wherein the anti-reflective coating material(s) conforms to the desired patterned outer surface(s) of each metal. In another embodiment, a coated metal component includes at least one metal having a patterned outer surface(s); and, a coating of at least one antireflective material deposited on the metal patterned outer surface by deposition, wherein the antireflective coating material(s) including effective amount of electrically conductive light scattering and/or wavelength absorbent properties.

10 Claims, 2 Drawing Sheets

ANTI-REFLECTIVE COATING ON PATTERNED METALS OR METALLIC SURFACES

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The present invention relates to an apparatus and process for coating surfaces of metal or metallic components, and more specifically, metal(s) having a patterned outer surface coated with antireflective material(s) exhibiting an optical reflection greater than about 40% and exhibiting an effective amount of electrically conductive light scattering and/or wavelength absorbent properties.

BACKGROUND OF THE INVENTION

Many state of the art optical waveguides rely on the ability of the wave-guiding structure to transmit a precise optical signal that is free from interference. This interference can come from external electromagnetic sources (external electromagnetic interference (EMI)), from nearby electro-optical circuits in the same device (cross-talk), or from spurious signals introduced by auxiliary elements of the waveguide itself (parasitic mode propagation). External EMI can be eliminated with proper shielding of the optical waveguide device, and cross-talk can be minimized by isolating elements in the waveguide device.

Parasitic mode propagation, which arises when a waveguide propagates a mode of electromagnetic radiation other than the intended mode(s) as an unforeseen consequence of the materials, methods, and/or geometrical parameters used in the construction of the waveguide, and is especially difficult to minimize because it often arises from the presence of elements of the waveguide that are critical to its operation, especially in military applications. A common cause of parasitic propagation is reflection of weak optical signals from metallic surfaces near the waveguide. These conductive surfaces are an essential element in active electro-optical devices, as electric voltages applied between them are typically the means by which optical signals are modulated. In state of the art waveguide devices, these surfaces are often moved as far away from the waveguide as practical and constructed with the minimum practical size, in order to minimize the effects of parasitic mode propagation. However, these remedies both result in significantly reduced waveguide performance.

Another means of minimizing parasitic mode propagation would be to deposit an anti-reflective coating on the metal electrodes. In order not to significantly impair waveguide performance, the coating material would ideally need to be electrically conductive. The difficulty with highly conductive materials; however, is that they tend to be highly reflective themselves. It is possible to reduce this effect using interference phenomena, but a more effective approach is to use a conductive material with an especially high absorbance at the wavelength of light for which the waveguide has been constructed. Platinum black is known to have such properties and is used as a coating on platinum electrodes to catalyze the reduction of hydronium ion to hydrogen and water (normal hydrogen electrode or NHE).

A major difficulty to overcome would be the need to pattern such a coating to conform to the metal surfaces in the waveguide. Most current anti-reflective coatings are applied as an undefined single or multiple layer stack on a flat surface. While in theory it might be possible to use lithographic etching techniques to pattern the anti-reflective layer to match a previously defined pattern in the substrate, the processing required would add significant time and expense to the production of precision optical waveguides, and in many circumstances this would prohibit the use of such techniques.

Thus, the development of an anti-reflective coating for patterned metal surfaces that is compatible with precision optical waveguide technology and requires no subsequent processing to define a matched pattern in the coating after deposition represents a significant, novel, and practical advance in optical waveguide and related technologies in which patterned anti-reflective coatings are required.

There presently is a need for an antireflective coating which functions as a light absorbing/scattering layer on gold electrodes.

SUMMARY OF THE INVENTION

The present invention relates to a process for coating metal or metallic surfaces including; providing at least one metal having a patterned outer surface exhibiting an optical reflection greater than about 40%, providing at least one anti-reflective coating material, the anti-reflective coating material(s) including an effective amount of electrically conductive light scattering and/or wavelength absorbent properties, and depositing the anti-reflective coating material(s) onto the patterned outer surface(s) of each metal, wherein the anti-reflective coating material(s) conforms to the desired patterned outer surface(s) of each metal.

Another embodiment of the present invention includes a coated metal component comprising; at least one metal having a patterned outer surface(s); and, a coating of at least one antireflective material deposited on the metal patterned outer surface by deposition, wherein the antireflective coating material(s) including an effective amount of electrically conductive light scattering and/or wavelength absorbent properties, wherein the effective amount antireflective material(s) being deposited on the patterned metal outer surface(s) having a thickness of about 10 nm to about 2 μm.

It is to be understood that the foregoing general description and the following detailed description are exemplary and explanatory only and are not to be viewed as being restrictive of the present invention, as claimed. Further advantages of this invention will be apparent after a review of the following detailed description of the disclosed embodiments, which are illustrated schematically in the accompanying drawings and in the appended claims.

DETAILED DESCRIPTION OF THE INVENTION

Figure 1:
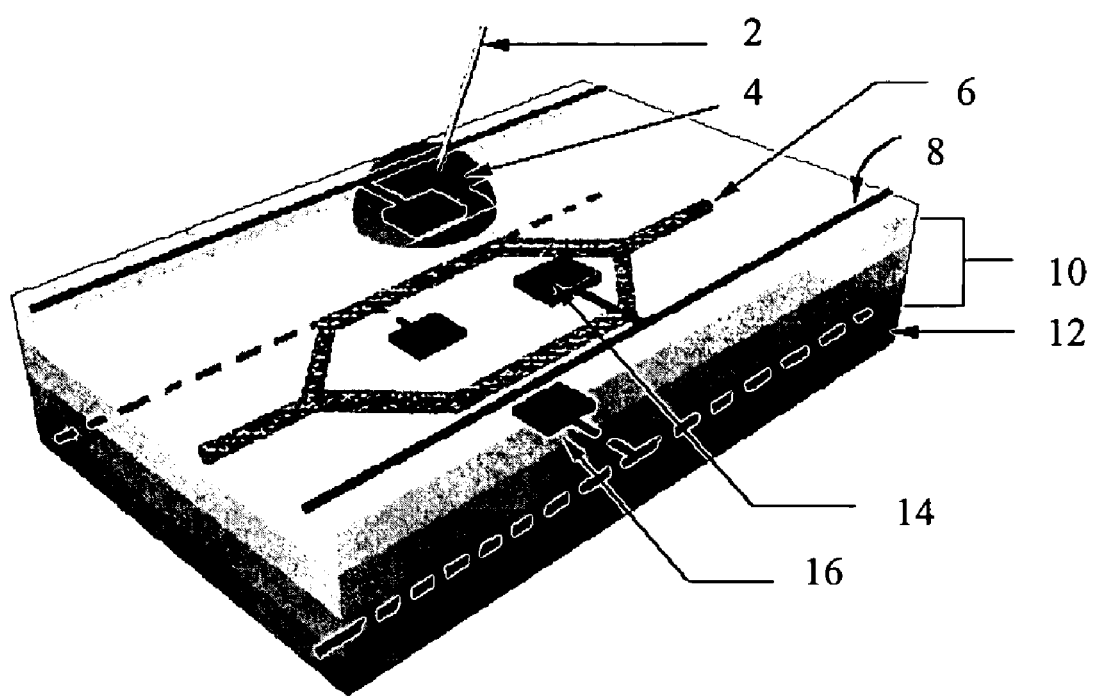
FIG. 1 is an illustration of patterned electrode surfaces used for optical waveguides showing patterned surfaces having a width of about 0.01 μm to about 1000 μm and a path length of at least 10 times the width and are connected to one another through numerous branches and junctions according to embodiments of the present invention.

The present invention relates to an apparatus and process for coating surfaces of metal or metallic components. Embodiments of the present invention includes a process for coating metal or metallic surfaces including; providing at least one metal having a patterned outer surface exhibiting an optical reflection greater than about 40%, providing at least one anti-reflective coating material, the anti-reflective coating material(s) include effective amounts of electrically conductive light scattering and/or wavelength absorbent properties, and depositing the anti-reflective coating material(s) onto the patterned outer surface(s) of each metal, wherein the anti-reflective coating material(s) conforms to the desired patterned outer surface(s) of each metal. The present invention also includes the antireflective-coated metal(s) and/or outer metal surface(s) products processed by the above processes.

In one embodiment, the present invention includes a coated metal component comprising; at least one metal having a patterned outer surface(s); and, a coating of at least one antireflective material deposited on the metal patterned outer surface by deposition, wherein the antireflective coating material(s) including effective amount of electrically conductive light scattering and/or wavelength absorbent properties, wherein the effective amount antireflective material(s) being deposited on the patterned metal outer surface(s) having a thickness of about 10 nm to about 2 µm.

The following descriptions of other embodiments of the present invention are applicable to both apparatuses and processes of the antireflective-coated metal or metallic components. The terms "onto" and "on" can be used interchangeably and include both surface layer deposition and impregnation within. The term "metal component(s)" includes, but is not limited to, metal(s), metallic(s), outer metal surface(s), and outer metallic surface(s). The outer metal surface(s) and/or the metal or metallic components includes at least one of gold, platinum, silver, nickel, chrome, copper, palladium, and any combination thereof. In other embodiments the metal(s) include at least one of gold, platinum, silver, nickel, chrome, copper, palladium, and any combination thereof. In one embodiment the metal(s) is at least one electrode. In another embodiment, the metal(s) is at least one gold electrode.

The antireflective coating material(s) of the present invention includes at least one of platinum black, nickel black, and any combination thereof. In one embodiment, the antireflective platinum black coating has a reflectivity ranging from 40% to 60% over a wavelength range of 0.1 µm to 2 µm. In other embodiments, the antireflective coating material(s) including electrically conductive light scattering properties with an effective reflectivity in the range of about 10% to about 60% over a wavelength of about 0.1 µm to about 1000 µm. The exact value of the reflectivity is dependent on the wavelength at which it is measured. Other embodiments include antireflective coating material(s) having electrically conductive wavelength absorbent properties with absorbencies in the range of about 0.1 per µm to about 1000 per µm. An effective amount of antireflective material(s) being substantially uniformly deposited on the patterned metal outer surface(s) includes a thickness of about 10 nm to about 2 µm. In one embodiment, the effective amount of antireflective material(s) being substantially uniformly deposited on the patterned metal outer surface(s) includes a thickness of about 100 nm.

There are several methods that are utilized for depositing the antireflective coating material(s) onto the patterned outer surface(s) of the metal(s). One method includes the process of electrochemical deposition. Other deposition processes that coat anti-reflective coating material(s) onto the patterned outer surface(s) of the metal(s) include, but not limited to at least one of chemical vapor deposition, molecular beam deposition, molecular beam epitaxial deposition, sputter coating, dip coating, implantation, interdiffusion, dip pen nanolithography, physical assembly via micromechanical devices, chemical conversion, and any combination thereof.

When depositing the antireflective coating material(s) the process includes suspending a portion of the patterned metal outer surface(s) into a plating solution to substantially uniformly coat the patterned metal outer surface(s) with the antireflective coating material(s). In an alternative embodiment, the present invention includes depositing the antireflective coating material(s) by placing at least one pool or at least one drop of plating solution onto the patterned metal outer surface(s) to substantially uniformly coat the patterned metal outer surface(s) with the antireflective coating material(s).

Embodiments of the metal component(s) produced include effective amounts of antireflective material(s) being substantially uniformly deposited on the patterned metal outer surface(s) having a thickness of about 100 nm. In other embodiments of the present invention, the metal component(s) include antireflective coating material(s) having electrically conductive light scattering properties with an effective reflectivity in the range of about 10% to about 60% over a wavelength of about 0.1 µm to about 1000 µm and the antireflective coating material(s) including electrically conductive wavelength absorbent properties with absorbencies in the range of about 0.1 µm to about 1000 µm. Other embodiments of the metal component(s) include a metal outer surface being gold and the antireflective coating material being platinum black. The antireflective-coated metal(s) and/or outer metal surfaces of the present invention are utilized in a device including, but not limited to, waveguides, integrated optical devices, photonic devices, and components involving propagation of electromagnetic radiation parallel to the antireflective coating material(s).

EXPERIMENTAL RESULTS

The electrode surfaces used for optical waveguides have a special geometry that is substantially distinguishable from a patterned surface in general. An example of this geometry would be a "circuit board" geometry, in which multiple lines or curves having a width of between 0.01 µm and 1000 µm, and a path length of at least ten times the width, are connected to one another through numerous branch and/or junction points. In addition, there can be multiple networks, each disconnected from the other, on the same surface. It is extremely difficult for traditional plating or deposition techniques to generate a uniform coating across one and only one network without coating either other networks or areas outside of the electrodes (owing to their very high aspect ratio). The technique of placing a small drop of plating solution 4 on only those portions of the substrate 12 that constitute the network of lines for which the coating is desired while avoiding deposition on those networks for which no coating is desired using platinum black is both novel and significant because it overcomes the difficulty described earlier. FIG. 1 illustrates an example of an optical waveguide device having a counter electrode 2, waveguide 6, connecting electrode 8, multilayer coating stack 10, substrate 12, uncoated electrode 14, and coated electrode 16. For example, FIG. 1 shows an optical waveguide device where a drop of plating solution 4 is deposited on one portion of the electrode (counter electrode 2) network where coating is desired.

All of the following experiments were performed on single wafer waveguides. The antireflective coating material utilized in these experiments was platinum black. Initially gold slides were utilized to test whether platinum black would electrochemically deposit. Once successfully tested, platinum black was electrochemically deposited on single wafer waveguides having gold electrodes 20 mm wide, 3 cm long, and approximately 0.25 mm thick, being deposited on a layer of chromium of the same dimensions, which itself was deposited on silicon nitride substrate. The gold was deposited by sputtering from a high purity target.

The desired patterned areas of the electrodes were contacted with a 0.072 M of $H_2PtCl_4$ (aqueous) solution and an electrical connection to a potentiostat. It is important to note that other electroplating solutions can be utilized with the present process. A counter electrode including a wire constructed of platinum (Pt) was contacted with the $H_2PtCl_4$ solution and the potentiostat. A reducing current of approximately 30 Amp/cm$^2$ was induced between the selected area to be electroplated (e.g. working electrode) and the counter electrode. This current resulted in the electrochemical deposition of platinum black coatings. The duration of the deposition varied from about 1-10 minutes; however, longer and shorter times would be used depending on, but not limited to the pattern on the metal surface(s), types of metal(s), and antireflective coating material(s) utilized.

Two of the waveguide samples were electrochemically deposited in an antireflective coating material (platinum black) for about 1, 2, and 3 minutes. Six other samples were electrochemically deposited for about 5 minutes and six more samples were electrochemically deposited for about 10 minutes. The variable that was changed in these experiments were the deposition times noted above. Solution concentrations and current densities were not varied in these experiments. However, varying solution concentrations and/or current densities are believed to yield slightly different results and it is also believed that the samples would yield ranges similar to the range variations in the above deposition times.

Figure 2:
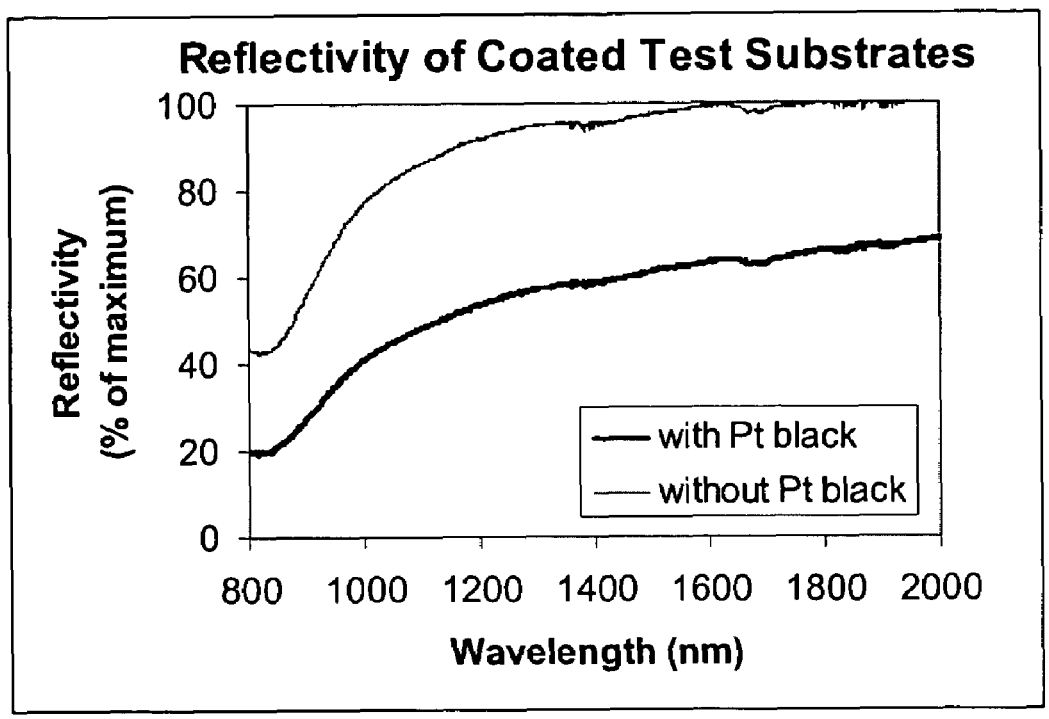
FIG. 2 is a graph illustrating reflectivity values on a gold test sample with and without the platinum black coating according to embodiments of the present invention.

FIG. 2 illustrates a graph showing the reflectivity of coated metal surfaces. In the graph, shown is the reflectivity (measured by Cary 5 spectrophotometer with diffuse reflectance accessory attached) on a gold test sample with and without the platinum black coating. The platinum black is deposited electrochemically to eliminate the need for masking, lithography, or shadow masks. While platinum black is also deposited by sputtering, this process would require masking or shadow masking since it is a non-directional (covers whole surface) method. The process for the electrochemical deposition of platinum black is a standard method. ("Electrochemistry for Chemist" 2$^{nd}$ Ed. Sawyer, D. T.; Sobkowiak, A.; and Roberts, J. L. Jr. John Wiley and Sons: New York, pp. 185-8.) A solution of chloroplatinic acid (0.027 M) in water (stabilized with lead acetate ($1.3 \times 10^{-4}$ M)) is held at a current density of 30 mA/cm$^2$ for between 1-10 min. However, in the experiments in the present invention a patterned gold electrode was suspended in the solution and plate between 1-1000 s to get the desired antireflective coating thickness. The thickness and surface roughness of the platinum black coating is modifiable by increasing or decreasing the deposition times, currents, and bath concentrations.

The test results have shown that thin platinum black layers decreased reflectivity by 40% at 1.3 μm, and by 36% at 1.55 μm. The wavelength dependence appeared to be an asymptotic exponential increase with increasing wavelength, from under 50% at 800 nm to about 70% at 2000 nm, which is consistent with an absorbing material. Surface roughness was quite low, from 25 to 35 Angstroms (Ra) for both samples. The 10 min sample had more defects, with an average of 1 defect of 1000-5000 Angstroms every 600 μm. The quality in general looked as good as the substrate. In addition, there was some evidence of a very fine texture visible at magnifications of about 100× with an optical microscope in reflected white light.

Major advantages of the present invention include, but are not limited to: a reduction in the unwanted propagation of electromagnetic radiation modes in waveguides due to reflections from pairs of opposing metal surfaces which are of necessity part of the waveguide; improvement in the signal to noise ratio of output signals from waveguides that incorporate metal surfaces in or near the areas where electromagnetic radiation is guided; reductions in the cost and complexity of high performance waveguides for electromagnetic radiation; improvements in the sensitivity and reductions in "false positive" readings (the apparent detection of a substance or phenomenon when no such substance or phenomenon actually is present) of sensors that rely on the propagation of electromagnetic radiation through regions that contain metal surfaces; decreased "error rates" (the frequency with which a bit or other packet of information is received in a state other than the state intended) in communications devices that require the passage of electromagnetic radiation near metal surfaces; and, reduced cost and complexity of assemblage of anti-reflective elements in micro electromechanical sensors (MEMS) or other devices with dimensions smaller than 1 mm.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A process of coating metal or metallic surfaces comprising:
   providing at least one metal having a patterned outer surface exhibiting an optical reflection greater than about 40%;
   providing at least one anti-reflective coating material having specific light scattering properties, selected from the group of electrically conductive materials consisting of platinum black and nickel black;
   said anti-reflective coating material(s) having effective reflectivity in the range from about 10% to about 60%;
   said effective reflectivity being the average reflectivity over a wavelength range from about 0.1 μm to about 1000 μm; and
   depositing said anti-reflective coating material(s) onto said patterned outer surface(s) of each said metal, wherein said anti-reflective coating material(s) having a thickness of about 10 nm to about 2 μm conforms to said patterned outer surface(s) of each said metal.

2. The process according to claim 1, wherein said depositing said antireflective coating material(s) includes suspending a portion of said patterned metal outer surface(s) into a plating solution to substantially uniformly coat said patterned metal outer surface(s) with said antireflective coating material(s).

3. The process according to claim 1, wherein said depositing said antireflective coating material(s) includes placing at least one pool or at least one drop of plating solution onto said patterned metal outer surface(s) to substantially uniformly coat said patterned metal outer surface(s) with said antireflective coating material(s).

4. The process according to claim 1, wherein said outer metal surface(s) comprises at least one of gold, platinum, silver, nickel, chrome, copper, palladium, and any combination thereof.

5. The process according to claim 1, wherein said metal(s) comprises at least one of gold, platinum, silver, nickel, chrome, copper, palladium, and any combination thereof.

6. The process according to claim 1, wherein said metal(s) is at least one electrode.

7. The process according to claim 1, wherein said metal(s) is at least one gold electrode.

8. The process according to claim 1, wherein said antireflective coating material(s) are effective to reduce parasitic mode propagation.

9. The process according to claim 1, wherein said effective amount of antireflective material deposited has a thickness of about 100 nm.

10. The process according to claim 1, wherein said depositing said anti-reflective coating material(s) onto said patterned outer surface(s) of said metal(s) is electrochemically deposited.

* * * * *